United States Patent
Hong et al.

(10) Patent No.: US 6,894,867 B2
(45) Date of Patent: May 17, 2005

(54) DISC DRIVE HOUSING WITH AIR GUIDE

(75) Inventors: Yiren Hong, Singapore (SG); ChoonKiat Lim, Singapore (SG); Mo Xu, Singapore (SG); HonLeong Wong, Singapore (SG); Niroot Jierapipatanakul, Singapore (SG); Wai Onn Chee, Singapore (SG); Joo Yong Teo, Singapore (SG); BoonSeng Ong, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/173,080

(22) Filed: Jun. 17, 2002

(65) Prior Publication Data

US 2003/0156350 A1 Aug. 21, 2003

Related U.S. Application Data

(60) Provisional application No. 60/372,757, filed on Apr. 11, 2002, and provisional application No. 60/359,273, filed on Feb. 20, 2002.

(51) Int. Cl.⁷ .............................................. G11B 33/14
(52) U.S. Cl. .................................................. 360/97.02
(58) Field of Search ........................... 360/97.02, 97.03, 360/97.04, 256.1; 96/17

(56) References Cited

U.S. PATENT DOCUMENTS

| | | | |
|---|---|---|---|
| 4,714,972 A | * 12/1987 | Biermeier et al. | 360/97.03 |
| 4,885,652 A | 12/1989 | Leonard et al. | 360/132 |
| 5,453,890 A | 9/1995 | Takegami et al. | 360/97.02 |
| 5,521,776 A | 5/1996 | Mochizuki | 360/97.02 |
| 5,541,791 A | * 7/1996 | Yamasaki et al. | 360/256.1 |
| 5,886,850 A | 3/1999 | Kaczeus et al. | 360/97.01 |
| 5,956,203 A | * 9/1999 | Schirle et al. | 360/97.03 |
| 6,208,484 B1 | 3/2001 | Voights | 360/97.02 |
| 6,266,208 B1 | 7/2001 | Voights | 360/97.02 |
| 6,296,691 B1 | * 10/2001 | Gidumal | 96/17 |
| 6,337,782 B1 | 1/2002 | Guerin et al. | 360/256.1 |
| 6,473,264 B2 | * 10/2002 | Bae et al. | 360/97.02 |
| 6,507,452 B1 | * 1/2003 | Bae et al. | 360/97.02 |
| 6,594,108 B2 | * 7/2003 | Naganathan et al. | 360/97.02 |
| 2002/0075590 A1 | * 6/2002 | Garikipati et al. | 360/97.02 |
| 2002/0089781 A1 | * 7/2002 | Tuma | 360/97.02 |
| 2003/0202276 A1 | * 10/2003 | Smith | 360/97.02 |

* cited by examiner

*Primary Examiner*—Tianjie Chen
(74) *Attorney, Agent, or Firm*—Westman, Champlin & Kelly, P.A.

(57) ABSTRACT

The present invention relates to an air guide for use in a disc drive such that air flow can be redirected to improve the efficiency of a filter located within the disc drive. Embodiments of the present invention provide for an air guide having air guide surfaces that, in conjunction with sides of the disc drive housing, are configured to channel air flow off a spinning disc, through a filter, and back into the mainstream air flow. The air guide may be formed as an integral unit with either the inner major surface of the cover or of the baseplate, or both, such that the air guide may extend over part of the disc surface and provide an effective channel for air flow without the need for additional assembly processes during manufacture.

23 Claims, 3 Drawing Sheets

DISC DRIVE HOUSING WITH AIR GUIDE

CROSS REFERENCE TO RELATED APPLICATIONS

This application claims benefit of U.S. Provisional Applications No. 60/359,273, filed Feb. 20, 2002, and No. 60/372,757, filed Apr. 11, 2002.

FIELD OF INVENTION

The present invention relates generally to disc drives. More particularly, the present invention relates to air flow direction within a disc drive.

BACKGROUND OF THE INVENTION

A disc drive is typically built with the intention of providing an internal environment within which the various components of a disc drive may operate. It has been shown that an internal environment with high particulate contamination can have an adverse impact on the performance of a disc drive. Therefore, various schemes have been devised to reduce particulate contamination, and some of these involve the use of a filter.

In the disc drive, there is generally one or more discs designed to rotate during drive operations. The discs may be arranged coaxially to form a disc stack which is mounted such that the disc stack is displaced from the center of a substantially rectangular disc drive housing, leaving room for a rotatable actuator to bring read/write heads across surfaces of the discs for reading date from or writing data to discs. As the disc stack is rotated during drive operations, it is hoped that the air movement generated will at the same time provide an air flow through a filter located adjacent the disc stack so as to facilitate the entrapment of particles by the filter. This alone, however, may not achieve the clean-up rate required for the internal environment to remain sufficiently free of particulate contamination. Furthermore, there may be certain "dead" spaces, especially at corners, where the air will not be replaced by the generated air flow. Locating a filter in such corners with the intention of maximizing space utilization may unfortunately have an adverse effect on the efficiency of the filter, which in turn may result in poor particulate contamination control.

The following description sets forth how embodiments of the present invention can provide a viable solution to these and other problems, and offer other advantages over the prior art.

SUMMARY OF THE INVENTION

The present invention relates to an air guide for use in a disc drive such that air flow can be redirected to improve the efficiency of a filter located within the disc drive. Embodiments of the present invention provide for an air guide having air guide surfaces that, in conjunction with sides of the disc drive housing, are configured to channel air flow off a spinning disc, through a filter, and back into the mainstream air flow. The air guide may be formed as an integral unit with either the inner major surface of the cover or of the baseplate, or both, such that the air guide may extend over part of the disc surface and provide an effective channel for air flow without the need for additional assembly processes during manufacture.

The air guide surfaces extend arcuately from the filter or the filter support, forming channels that have increasingly large cross-sections the further away from the filter or the filter support. The orientation of the air guide encourages improved air flow through the filter and avoids the formation of "dead" space around the filter that may reduce the efficiency of the filter.

These and various other features as well as advantages which characterize the present invention will be apparent upon reading of the following detailed description and review of the associated drawings.

DETAILED DESCRIPTION

Figure 1:
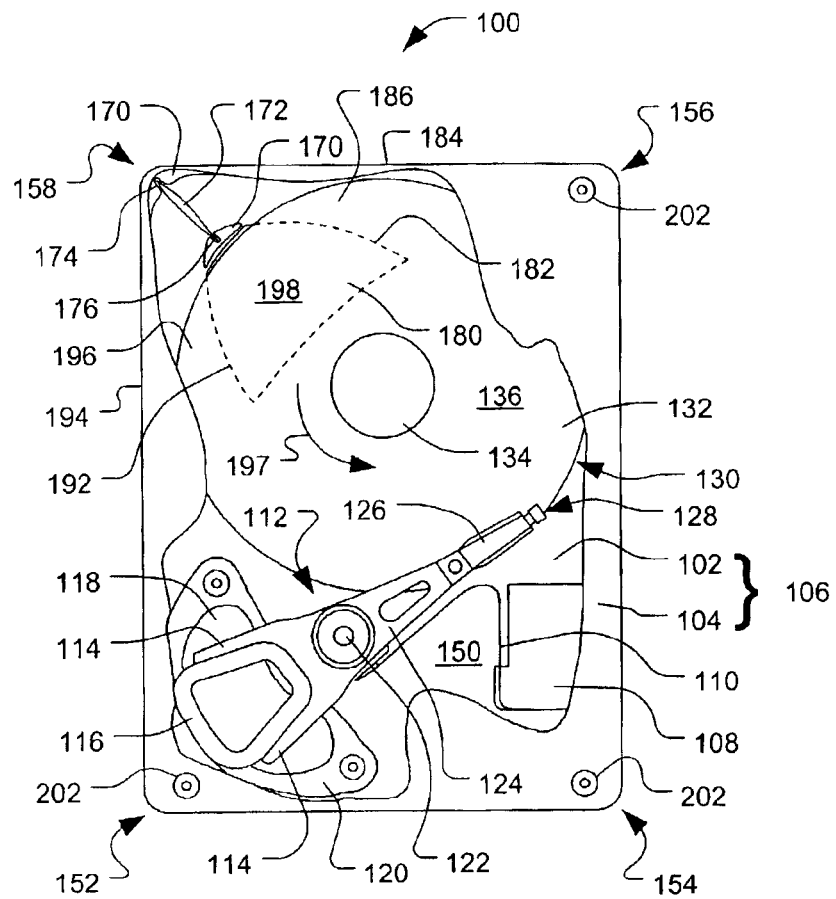
FIG. 1 is a plan view of a disc drive.

FIG. 1 shows a disc drive 100 incorporating one embodiment of the present invention. There is provided a baseplate 104 to which many of the various disc drive components are mounted. The baseplate may be part of the disc drive housing which includes a cover 102 complementary to the baseplate such that these two disc drive housing components 106 may together form an enclosure and provide a relatively controlled environment for the other disc drive components.

Fastened to an outer major surface of the baseplate is a printed circuit board assembly (not shown) on which most of the circuitry controlling disc drive operations may be found. A connector 108 is provided for communication between the circuitry on the printed circuit board and the circuitry within the enclosure. The circuitry may be disposed on a flexible printed circuit cable 110 leading from the connector to an actuator 112.

The actuator includes support arms 114 that supports a voice coil 116 adjacent one or more magnet 118. A top plate and a bottom plate 120 are arranged above and below the magnets to dose the magnetic flux. When current is passed through the voice coil, electromagnetic forces act on the voice coil, causing the actuator to rotate about its pivot 122, swinging the one or more actuator arms 124 that extend from the actuator. The actuator arms generally extend in a direction opposite to the direction in which the voice coil support extends. Attached to a distal end of each actuator arm may be one or two suspensions 126. Each suspension carries read/write heads 128 at its free end. Data and control signals are carried on flexible printed circuit cables between the read/write heads and the printed circuit board assembly. Disposed on the actuator or one of the actuator arms is a preamplifier for amplifying signals that are being carried by the flexible printed circuit cables to the printed circuit board assembly.

Mounted to the baseplate is a disc stack 130 that includes a disc 132 mounted to a spindle motor by the use of a disc clamp 134. In some embodiments, there is more than one disc in the disc drive, in which case the discs are mounted in a generally coaxial fashion on the spindle motor. The disc surfaces 136 may be formatted to store data along nominally concentric tracks. During drive operations, the designated read/write heads are held in proximity to a corresponding disc surface and, as the disc is rotated, data may be read from or written to the desired track.

The baseplate has a substantially rectangular major surface 150 generally defining four corners 152, 154, 156, 158. The disc stack may be positioned with an offset from the center of the baseplate such that the disc is nearer to two of the four corners 156, 158. At one of these nearer corners is provided a filter support 170. The filter support may be formed together with the baseplate as a unitary article, and is formed to support or retain a filter 172. The filter support may include two opposing slots substantially perpendicular to the major surface of the baseplate. One of the opposing slots 174 may be formed at a corner of the baseplate, facing away from the corner. The other opposing slot 176 may be formed adjacent to the disc, facing away from the disc. The filter may be formed for slidable engagement with the opposing slots, and thus be retained in place by the filter support. The orientation of the filter is chosen to maximize the utilization of space within the disc drive, and at the same time to present maximum surface area of the filter to any oncoming air flow.

According to one embodiment of the present invention, there is provided a disc drive housing component with an air guide 180 formed as one unitary article. The air guide may be stamped from the same sheet of metal that is used to form the disc drive housing component. Alternatively, the cover and the air guide may be molded as a unitary article from metal or polymer. Use of such disc drive housing components with integrated air guide features would simplify and speed up manufacturing processes because fewer assembly processes would be necessary, and in certain cases, improved component tolerances may be achieved.

Optionally, an air guide 180 of the present invention is provided on the baseplate as indicated by the dotted lines in FIG. 1. The air guide is disposed on the inner major surface of the baseplate with a first air guide surface 182 extending substantially perpendicular to the inner major surface of the baseplate. Together with a first side 184 of the baseplate, the first air guide surface forms a first channel 186 for air flow, leading from the disc to the filter support. Optionally, the first air guide surface extends arcuately, from the filter support towards the disc, away from the first side. A second guide surface 192 extending from the inner major surface of the baseplate forms a second channel 196 for air flow with a second side 194 of the baseplate, leading from the filter support to the disc. Assuming that the disc is made to rotate in an anti-clockwise direction 197 during drive operations, the air flow generated by the spinning disc would be guided through the first channel to pass through the filter and then be directed away from the filter. A third air guide surface 198 contiguous with the first air guide surface and the second air guide surface may be formed such that it is substantially parallel to the inner major surface of the baseplate. Alternatively, the third air guide surface may be inclined with respect to the major surface of the baseplate. The location of an air guide of the present invention is shown in dotted lines in FIG. 1.

According to another embodiment, the air guide is provided on an inner major surface 200 (FIG. 2) of the cover of the disc drive at a location indicated by the dotted lines in FIG. 1. When the cover is in assembly with the baseplate, by use of screws 202 or other fastening measures, the inner major surface of the cover faces the interior of the disc drive with the air guide located near the filter support. The air guide disposed on the cover protrudes from the inner major surface of the cover. Together with a first side of the baseplate, a first air guide surface forms a first channel of gradually decreasing cross-section for air flow, leading from the disc to the filter support. Optionally, the first air guide surface extends arcuately, from the filter support towards the disc, away from the first side.

The air guide further includes a second air guide surface is disposed at a radial displacement from the first air guide surface and generally faces away from the first air guide surface. The second air guide surface protrudes from the inner major surface of the cover. Together with a second side of the baseplate, the second air guide surface forms a second channel of gradually increasing cross-section for air flow, leading from the filter support to the disc. Optionally, the second air guide surface extends arcuately, from the filter support towards the disc, away from the second side.

The first side and the second side are substantially perpendicular to each other, and meet at the corner where the filter support is located. It will be understood that the first side and the second side may be defined by the cover which is adapted for assembly with a complementary baseplate. References to a first side and a second side will be understood to refer generally to respective sides, edges or walls defining the limits of a major surface of a disc drive housing component. A third air guide surface 198 contiguous with the first air guide surface and the second air guide surface may be formed such that it is substantially parallel to the inner major surface of the baseplate. Alternatively, the third air guide surface may be inclined with respect to the major surface of the cover.

Figure 2:
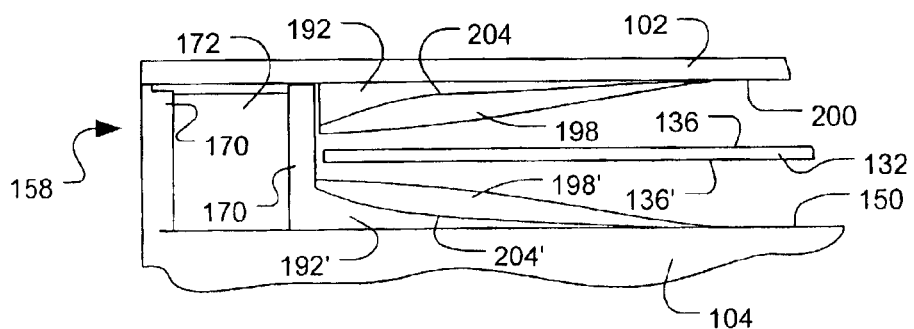
FIG. 2 is a side view showing one embodiment of the present invention.

In another embodiment, an air guide 180, 180' is provided on both the cover and the baseplate, as shown in FIG. 2. Optionally, each air guide includes a third air guide surface 198, 198' contiguous with the respective first air guide surface (not shown) and second air guide surface 192, 192'. The third air guide surface of the air guide on the cover is inclined away from the inner major surface of the cover as it approaches the filter support. The third air guide surface of the air guide on the baseplate may be inclined away from the inner major surface of the baseplate as it approaches the filter support. In other words, the third air guide surface may be graduated towards the respective disc surface 136, 136' as it approaches the filter support. Thus, the mainstream air flow generated by the spinning disc may be diverted away from the disc and redirected through the filter in the filter support before it is reintroduced to the mainstream airflow. The various air guide surfaces provide a curved constriction for channeling the air flow so as to avoid inducing turbulent flow behavior.

The third air guide surface may also be shaped with a central portion that is nearer to disc surface than the edges 204, 204' where the third air guide surface meets the first air guide surface or the second air guide surface. In other words, in addition to an inclination with respect to the inner major surface on which the third air guide surface is disposed, the third air guide surface may provide an extended surface to both the first air guide surface and the second air guide surface, and thereby provide improved channeling of the air flow.

Figure 3:
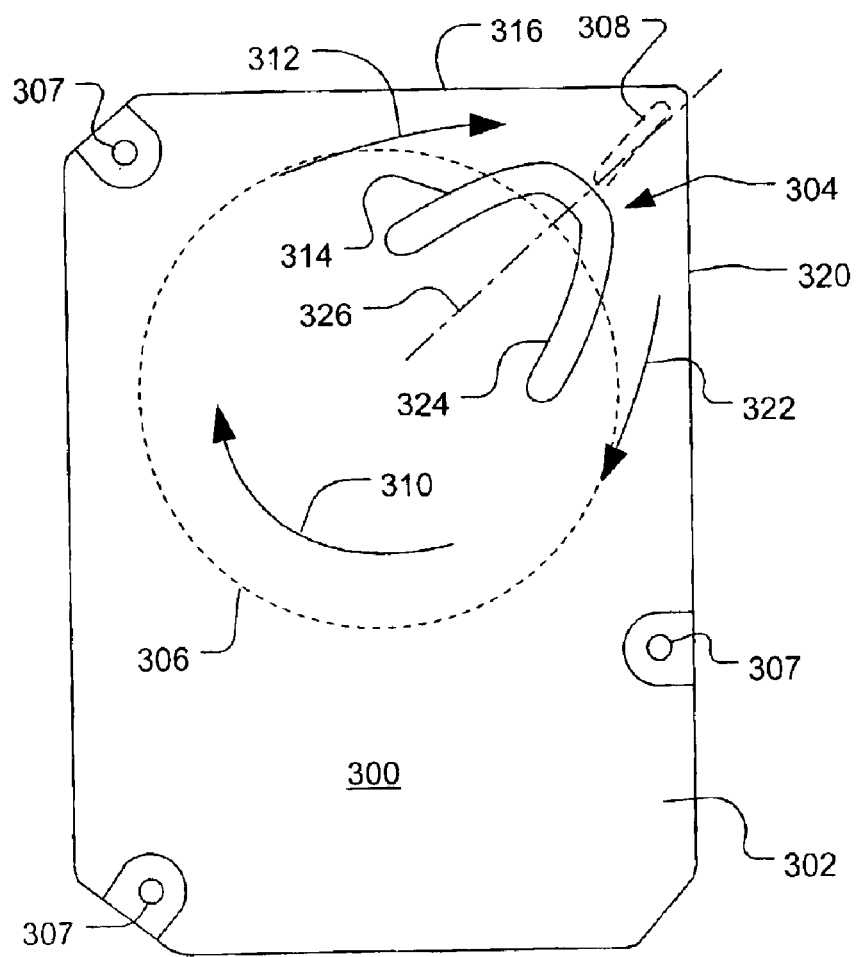
FIG. 3 is a plan view of a disc drive housing component according to one embodiment of the present invention.

FIG. 3 shows an inner major surface 300 of a substantially rectangular cover 302 with an air guide 304 formed together as a unitary article. The cover is adapted for assembly with a baseplate. In the example illustrated, the cover includes through holes 307 for this purpose. Dotted lines show the location of the disc 306 and the filter 308 when the cover is in assembly with the rest of the disc drive. When the disc is rotated in the direction indicated by the arrow 310, air is carried by the disc and thrown off in a direction 312 substantially tangential to the disc. The first air guide surface 314 is curved so that it is nearer to a first side 316 of the cover as it approaches the filter, and also to received part of the mainstream air flow generated by the spinning disc. The second air guide surface 318 may be similarly curved so that it is nearer to a second side 320 of the cover as it approaches the filter. Alternatively, the first air guide surface may have a different degree of curvature compared to the second air guide surface. The second air guide surface is configured to direct air flow leaving the filter in a direction 322 suitable for introduction back to the mainstream air flow. The air guide may include a third air guide surface 324 that is essentially concaved, extending from the inner major surface of the cover and contiguous with the first air guide surface and the second air guide surface. Depending on the method of formation, the air guide may be solid or hollow between the third air guide surface and the first air guide surface and between the third air guide surface and the second air guide surface.

The first air guide surface may about as long as the second air guide surface. Optionally, the air guide is generally symmetrical about an axis 326 substantially between the first air guide surface and the second air guide surface, and oriented such that the axis passes through the filter support.

Figure 4:
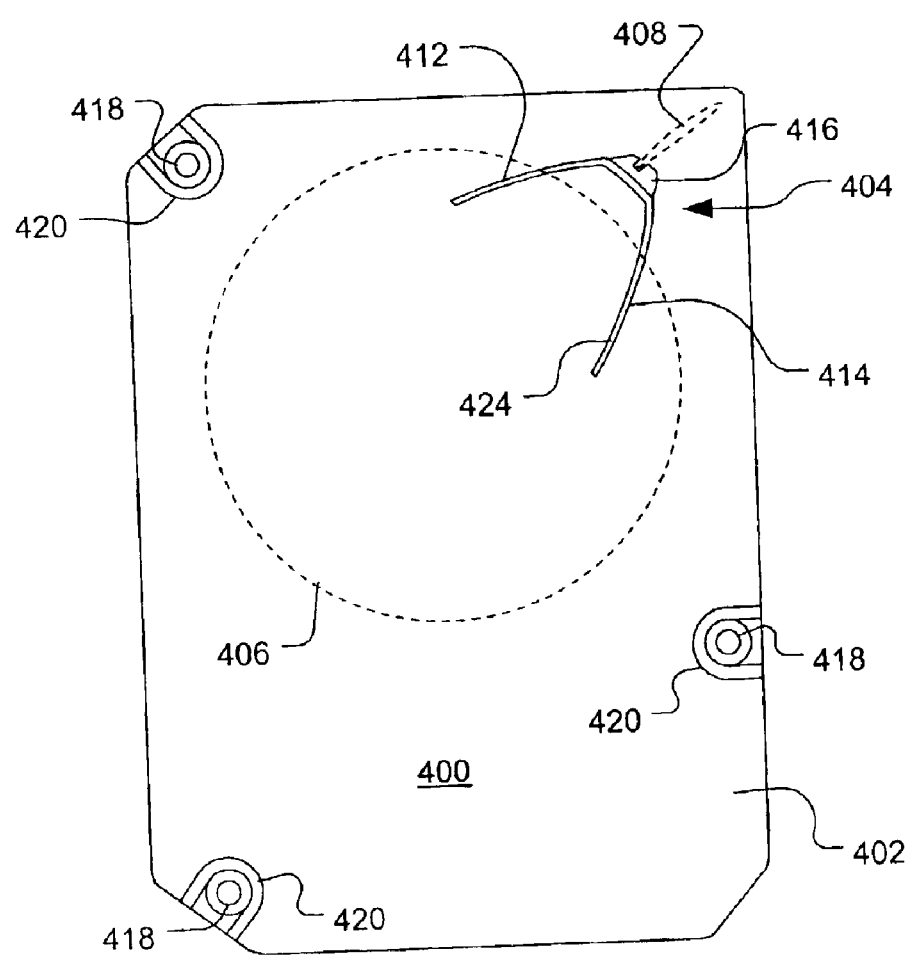
FIG. 4 is a plan view of a disc drive housing component according to another embodiment of the present invention.

FIG. 4 shows an inner major surface 400 of a cover 402 with an air guide 404. Dotted lines show the location of the disc 406 and the filter 408. As in the embodiment of FIG. 3, the first air guide surface 412 and the second air guide surface 414 are formed with curvatures adapted to direct air flow from the disc in motion to the filter and then away from the filter for introduction back to the mainstream air flow generated by the spinning disc. The air guide may include a protrusion 416 from the inner major surface of the cover. The protrusion, interposed between the first air guide surface and the second air guide surface, is formed to complement part of the filter support so as to provide abutment against that part of the filter support. Optionally, the cover, the air guide and the protrusion may be molded as a unitary article. The cover may include holes 418 for use in fastening the cover to a complementary baseplate as well as configurations 420 to improve stiffness characteristics of the cover.

In the foregoing description, the filter is described as being located at a corner 158 (FIG. 1) adjacent to the disc, upstream from the actuator, where the air flow is more likely to be relatively stable as compared to other regions near the disc. The use of the air guide thus provides a further advantage that the mature air flow pattern that has developed in that region will not be severely disturbed by the need to direct at least some of that air flow through a filter. Alternative locations of the filter and the air guide may also be chosen. For example, the filter may be located at the other corner 156 adjacent to the disc, downstream from the actuator. Optionally, the location of the filter and the air guide may be determined by the air flow conditions in various regions within the disc drive that can take advantage of the present invention to increase air flow through the filter without severely disturbing the stability of the air flow.

Embodiments of the present invention may be alternatively described as follows:

An air guide is located at a corner of a disc drive housing component. The air guide includes a first air guide surface protruding from a major surface of the disc drive housing component and a second air guide surface protruding from the major surface. The first air guide surface extends arcuately away from the corner and the second air guide surface extends arcuately away from the corner.

Optionally, the first air guide surface and the second air guide surface are adjacent to a filter support. In one embodiment, the second air guide surface is radially displaced from the first air guide surface. The air guide may be oriented such that, with the corner being defined by a first wall and a second wall, the first air guide surface is further away from the first wall as the first air guide surface extends away from the corner. The second air guide surface may be further away from the second wall as the second air guide surface extends away from the corner.

Optionally, the air guide may further includes a third air guide surface that is contiguous with the first air guide surface and the second air guide surface. The third air guide surface may be substantially parallel to the major surface, it may be inclined with respect to the major surface, or it may define a plane that is curved with respect to the major surface.

The disc drive housing component may be formed with the air guide as a unitary piece. Optionally, the disc drive housing component and the air guide are molded from plastic.

According to another embodiment, there is provided a disc drive having a disc drive housing that includes a major surface defining a first side and a second side, a filter support and an air guide. The first side and the second side define a corner at which the filter support is located. The air guide includes a first air guide surface protruding from the major surface such that the first air guide surface and the first side define a first channel that increases in cross-section as the first air guide surface extends arcuately away from the filter support. The air guide also includes a second air guide surface protruding from the major surface such that the second air guide surface and the second wall define a second channel that increases in cross-section as the second air guide extends arcuately away from the filter support.

The disc drive may be configured such that the first air guide surface and the second air guide surface meet at the filter support. The second air guide surface may be oriented so that it is radially displaced from the first air guide surface. Optionally, the first air guide surface is further away from the first side as the first air guide surface extends away from the filter support. The second air guide surface may be formed to be further away from the second side as the second air guide extends away from the filter support.

The disc drive may be further configured such that the air guide has a third air guide surface that is contiguous with the first air guide surface and the second air guide surface. The third air guide surface may be substantially parallel to the major surface. Alternatively, the third air guide surface may be inclined with respect to the major surface. In another alternative embodiment, the third air guide surface defines a plane that is curved with respect to the major surface.

The disc drive may be built with the air guide formed as a unitary piece with the disc drive housing component. Optionally, the air guide is molded with the disc drive housing component from plastic.

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the size and location of the air guide may vary depending on the particular disc drive configuration while maintaining substantially the same functionality of improving the efficiency of the filter by increasing air flow through the filter. In addition, although the preferred embodiment described herein is directed to an air guide for directing air flow in a disc drive, it will be appreciated by those skilled in the art that the teachings of the present invention can be applied to data storage systems without departing from the scope of the present invention.

What is claimed is:

1. An air guide located at a corner of a disc drive housing component, the air guide comprising:
    a first air guide surface protruding from a major surface of the disc drive housing component, in which the first air guide surface extends arcuately away from the corner;
    a second air guide surface protruding from the major surface, in which the second air guide surface extends arcuately away from the corner; and
    wherein the first and second air guide surfaces extend over a disc in the disc drive housing.

2. The air guide of claim 1 in which the first air guide surface and the second air guide surface are adjacent to a filter support.

3. The air guide of claim 2 in which the first air guide surface and the second air guide surface meet at the filter support.

4. The air guide of claim 1 in which the second air guide surface is radially displaced from the first air guide surface.

5. The air guide of claim 4 in which the corner is defined by a first wall and a second wall, and in which the first air guide surface being further away from the first wall as the first air guide surface extends away from the corner.

6. The air guide of claim 5 in which the second air guide surface is further away from the second wall as the second air guide surface extends away from the corner.

7. The air guide of claim 4 further comprising a third air guide surface contiguous with the first air guide surface and the second air guide surface.

8. The air guide of claim 7 in which the third air guide surface is substantially parallel to the major surface.

9. The air guide of claim 8 in which the third guide surface is inclined with respect to the major surface.

10. The air guide of claim 8 in which the third guide surface defines a plane that is curved with respect to the major surface.

11. The disc drive housing component of claim 1 in which the air guide is formed as a unitary piece with the disc drive housing component.

12. The disc drive housing component of claim 11 in which the air guide is molded with the disc drive housing component from plastic.

13. A disc drive comprising:
    a disc drive housing having:
        a major surface defining a first side and a second side, the first side and the second side further defining a corner;
        a filter support in the corner; and
        an air guide comprising:
            a first air guide surface protruding from the major surface, the first air guide surface and the first side defining a first channel that increases in cross-section as the first air guide surface extends arcuately away from the filter support;
            a second air guide surface protruding from the major surface, the second air guide surface and the second side defining a second channel that increases in cross-section as the second air guide extends arcuately away from the filter support; and
        wherein the first and second air guide surfaces extend over a disc in the disc drive housing.

14. The disc drive of claim 13 in which the first air guide surface and the second air guide surface meet at the filter support.

15. The disc drive of claim 13 in which the second air guide surface is radially displaced from the first air guide surface.

16. The disc drive of claim 15 in which the first air guide surface is further away from the first side as the first air guide surface extends away from the filter support.

17. The disc drive of claim 15 in which the second air guide surface is further away from the second side as the second air guide extends away from the filter support.

18. The disc drive of claim 15 in which the air guide further comprises a third air guide surface contiguous with the first air guide surface and the second air guide surface.

19. The disc drive of claim 18 in which the third air guide surface is substantially parallel to the major surface.

20. The disc drive of claim 18 in which the third air guide surface is inclined with respect to the major surface.

21. The disc drive of claim 18 in which the third air guide surface defines a plane that is curved with respect to the major surface.

22. The disc drive of claim 13 in which the air guide is formed as a unitary piece with the disc drive housing component.

23. The disc drive of claim 22 in which the air guide is molded with the disc drive housing component from plastic.

* * * * *